(12) United States Patent
Schell

(10) Patent No.: US 7,965,122 B2
(45) Date of Patent: Jun. 21, 2011

(54) SYSTEM AND METHOD FOR PROVIDING A COMPATIBLE SIGNAL TO A MEDICAL DEVICE

(75) Inventor: Robert D. Schell, Goshen, IN (US)

(73) Assignee: Bayer Healthcare LLC, Tarrytown, NY (US)

( * ) Notice: Subject to any disclaimer, the term of this patent is extended or adjusted under 35 U.S.C. 154(b) by 0 days.

(21) Appl. No.: 12/721,111

(22) Filed: Mar. 10, 2010

(65) Prior Publication Data

US 2010/0164545 A1 Jul. 1, 2010

Related U.S. Application Data

(63) Continuation of application No. 10/447,584, filed on May 30, 2003, now Pat. No. 7,705,653.

(60) Provisional application No. 60/385,285, filed on Jun. 4, 2002.

(51) Int. Cl.
*H03L 5/00* (2006.01)

(52) U.S. Cl. ............ 327/333; 327/407; 326/62

(58) Field of Classification Search ........ 327/333, 327/407; 326/62
See application file for complete search history.

(56) References Cited

U.S. PATENT DOCUMENTS

| 5,331,672 | A | 7/1994 | Evans et al. |
| 5,555,545 | A | 9/1996 | Yang |
| 5,648,972 | A | 7/1997 | Gharakhanian |
| 5,729,204 | A | 3/1998 | Fackler et al. |
| 6,073,201 | A | 6/2000 | Jolley et al. |
| 6,162,397 | A | 12/2000 | Jurik et al. |
| 7,705,653 | B2 * | 4/2010 | Schell ............ 327/333 |

FOREIGN PATENT DOCUMENTS

| EP | 0387630 A2 | 9/1990 |
| JP | 2002-006986 | 1/2002 |
| JP | 2002-007302 | 1/2002 |
| WO | 9528185 A1 | 10/1995 |
| WO | 9640367 A1 | 12/1996 |

OTHER PUBLICATIONS

Search Report for EP 03011594.3 (Jun. 1, 2007); 3 pages.

* cited by examiner

*Primary Examiner* — Kenneth B. Wells
(74) *Attorney, Agent, or Firm* — Nixon Peabody LLP

(57) ABSTRACT

An interface system delivers an output signal having a first signal characteristic in response to first and second input signals having the first signal characteristic and a second, different signal characteristic. The interface system includes a signal input for receiving a first signal having a first signal characteristic and a second signal having a second signal characteristic which is different from the first signal characteristic, a detector circuit for detecting whether the signal at the input is the first signal or the second signal, and a translator circuit for translating either of the first signal or the second signal into the output signal.

20 Claims, 5 Drawing Sheets

SYSTEM AND METHOD FOR PROVIDING A COMPATIBLE SIGNAL TO A MEDICAL DEVICE

CROSS REFERENCE TO RELATED APPLICATIONS

The present application is a continuation of U.S. patent application Ser. No. 10/447,584 filed May 30, 2003 now U.S. Pat. No. 7,705,653 and titled "System and Method for Providing a Compatible Signal to a Medical Device," which claims the benefit of U.S. Provisional Application No. 60/385,285, filed Jun. 4, 2002 and titled "Interface System." The contents of these applications are incorporated entirely herein by reference.

FIELD OF THE INVENTION

This invention is directed generally to an improvement in a monitoring system, and more particularly, to a novel interface device for interconnecting two or more different monitoring devices with a processor, such as a personal computer (PC), laptop, hand-held system or the like.

BACKGROUND OF THE INVENTION

While the invention may find other uses, the ensuing description refers specifically to its use with blood glucose monitoring systems.

Those who have irregular blood glucose concentration levels are medically required to regularly self-monitor their blood glucose concentration level. An irregular blood glucose level can be brought on by a variety of reasons including illness such as diabetes. The purpose of monitoring the blood glucose concentration level is to determine the blood glucose concentration level and then to take corrective action, if needed, based upon whether the level is too high or too low, to bring the level back within a normal range. The failure to take corrective action can have serious implications. When blood glucose levels drop too low—a condition known as hypoglycemia—a person can become nervous, shaky and confused. That person's judgment may become impaired and that person may eventually pass out. A person can also become very ill if their blood glucose level becomes too high—a condition known as hyperglycemia.

One method of monitoring a person's blood glucose level is with a portable, hand-held blood glucose testing device. The portable nature of these devices enables the users to conveniently test their blood glucose levels wherever the user may be. The glucose testing device includes a biosensor to harvest the blood for analysis. One type of biosensor is the electrochemical biosensor. The electrochemical biosensor includes a reagent designed to react with glucose in the blood to create an oxidation current at electrodes disposed within the electrochemical biosensor which is directly proportional to the user's blood glucose concentration. Such a biosensor is described in U.S. Pat. Nos. 5,120,420, 5,660,791, 5,759,364 and 5,798,031. Another type of sensor is an optical biosensor, which incorporates a reagent designed to produce a calorimetric reaction indicative of a user's blood glucose concentration level. The calorimetric reaction is then read by a spectrometer incorporated into the testing device. Such an optical biosensor is described in U.S. Pat. No. 5,194,393.

In order to check a person's blood glucose level, a drop of blood is obtained from the person's fingertip using a lancing device, and the blood is harvested using the biosensor. The biosensor, which is inserted into a testing unit or "meter" is brought into contact with the blood drop. The biosensor draws the blood, via capillary action, inside the biosensor and the ensuing electrochemical reaction is measured by the test unit which then determines the concentration of glucose in the blood. Once the results of the test are displayed on a display of the test unit, the biosensor is discarded. Each new test requires a new biosensor.

The invention concerns an adapter which permits different types of monitoring is devices to exchange signals with a processor, such as a personal computer (PC) or the like. This involves electronically differentiating between and automatically adapting to an open-collector signaling convention or an RS-232 (EIA-232) compatible signaling convention.

One existing blood glucose meter has an RS-232 (EIA-232) compatible output port with a custom connector. A redesign of this meter's electronics has been undertaken to reduce cost. However, the connector is molded into the case and a mold change is beyond the project scope. Therefore, the redesigned meter must use the same connector as the earlier meter. Component and cost savings would, however, accrue if the RS-232 (EIA-232) compatible interface were replaced by an open-collector (OC) interface; however, the existing I/O cable, used for coupling the meter to a PC, would not be compatible with this change. To simplify meter-to-computer interfacing for professionals that will be seeing both meter types (i.e., OC and RS-232 (EIA-232)), it would be advantageous to develop a single cable that would automatically work with either meter. The invention provides an electronic circuit, to be implemented in a modified cable, for accomplishing the above. If a stereo plug is wired in parallel with the plug, compatibility can be extended to other existing "open collector" output meters.

Existing cables are not compatible with both signaling conventions. The one prior interface device, "Basic Cradle™" can handle both signaling conventions, but not automatically through a shared connector. This is true in part because of the incompatible plug/connector design of some other OC type meters.

The proposed invention will handle both signaling conventions automatically through a shared plug. It identifies the signal convention by monitoring for a negative marking voltage that is unique to the RS-232 (EIA-232) compatible interface of the existing meter. It uses the detected interface type to automatically correct signal polarity and adjust the signal detection level for the serial data stream. The level-shifted and polarity-corrected data stream is then fed to another level translator to produce an RS-232 (EIA-232) compatible signal for the host computer. Like at least one existing cable, the interface is powered via signal pins of the host computer interface.

OBJECTS OF THE INVENTION

Accordingly, it is a general object of the invention to provide an adapter which permits different types of monitoring devices to exchange signals with a processor, such as a personal computer (PC) or the like.

SUMMARY OF THE INVENTION

Briefly, in accordance with the foregoing, an interface system for delivering an output signal having a signal characteristic in response to first and second input signals having said first signal characteristic and a second different signal characteristic, comprises a signal input for receiving a first signal having a first signal characteristic and a second signal having a second signal characteristic which is different from said first signal characteristic, a detector circuit for detecting whether the signal at said input is said first signal or said second signal, and a translator circuit for translating either said first signal or said second signal into said output signal.

In accordance with another aspect of the invention, an interface method for delivering an output signal having a given signal characteristic in response to first and second input signals having said first signal characteristic and a second, different signal characteristic, comprises receiving a first signal having a first signal characteristic and a second signal having a second signal characteristic which is different from said first signal characteristic, detecting whether the signal at said input is said first signal or said second signal, and translating either said first signal or said second signal into said output signal.

In accordance with another aspect of the invention, an interface system for delivering an output signal having a signal characteristic in response to first and second input signals having said first signal characteristic and a second, different signal characteristic, comprises means for receiving a first signal having a first signal characteristic and a second signal having a second signal characteristic which is different from said first signal characteristic, means for detecting whether the signal at said input is said first signal or said second signal, and means for translating either of said first signal or said second signal into said output signal.

DETAILED DESCRIPTION OF THE ILLUSTRATED EMBODIMENT

The present "Dex™" meter (a blood glucose monitoring device) has an I/O port with a custom connector and uses RS-232 (EIA-232)-compatible signals. To save costs in a new meter design, called "Dex CURE™", it is necessary to use the same connector, but would be desirable to use an open collector (OC) interface built into a previously designed data acquisition ASIC, used in the prior "Elite™" meter. The "OC" meter output is an open collector transistor with series resistor. The transistor's emitter is referenced to signal ground. The polarities of the two meter outputs (OC and RS-232 (EIA-232)) are also reversed. Accordingly, the present I/O cable is unsuitable for use with this new meter interface. It would be useful to have a common I/O cable or "interface" for use with both the Dex™ and Dex CURE™ meters that would automatically adapt to the interface type (OC or RS-232 (EIA-232)) of the meter to which it is connected.

Figure 1:
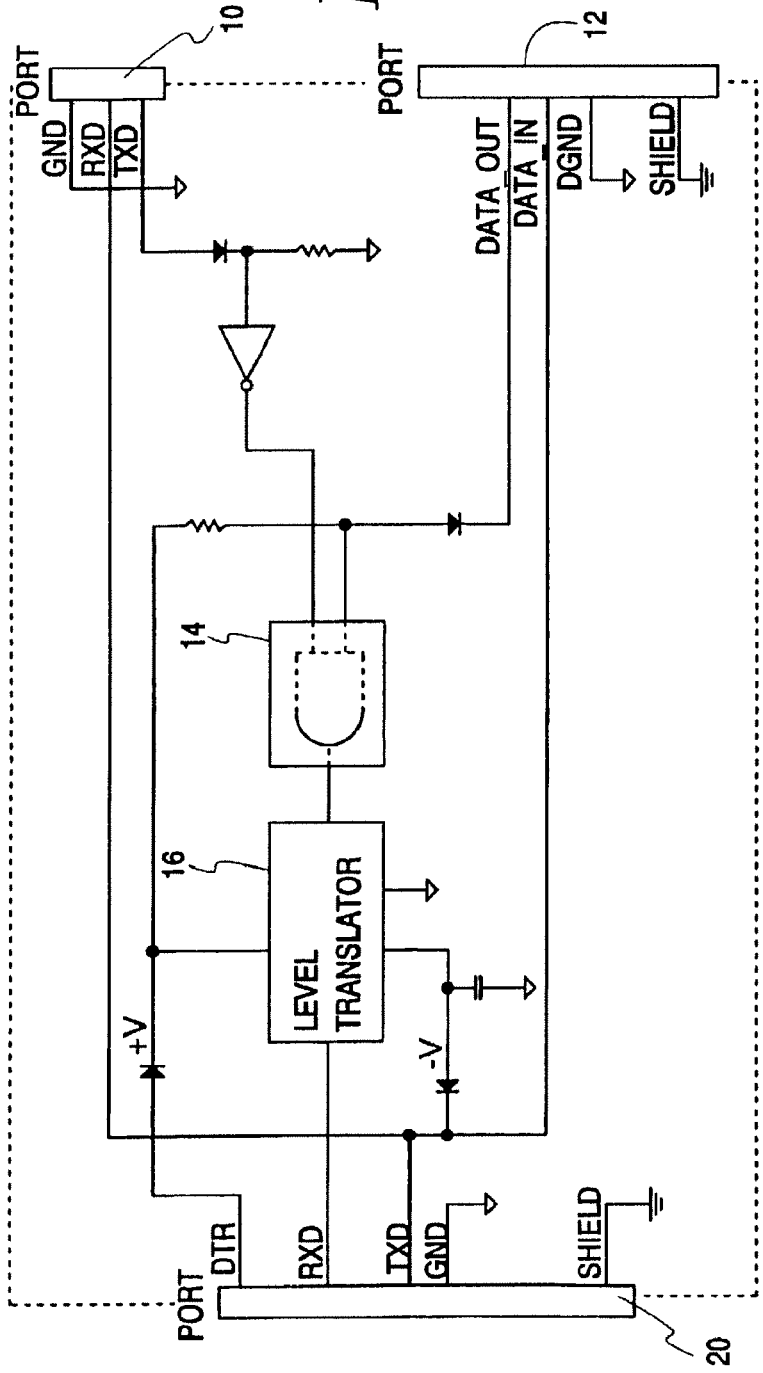
FIG. 1 is a block diagram of a prior art cable device.
Figure 2:
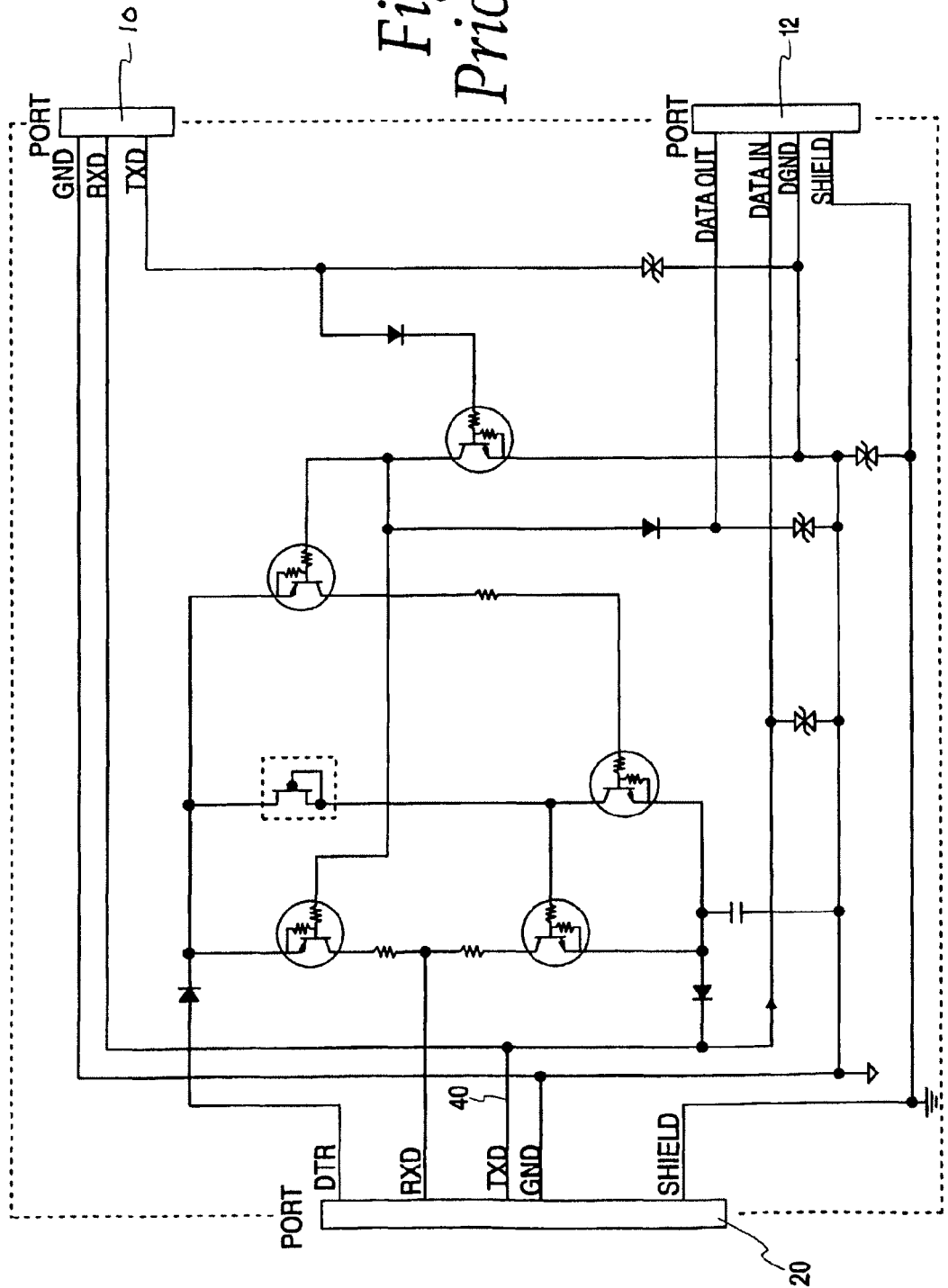
FIG. 2 is a somewhat more detailed schematic of the device of FIG. 1.

The (prior art) Basic Cradle™ electronics had the ability to interface with either the RS-232 (EIA-232)-compatible interface of a Dex™ meter or the open-collector logic level interface of an Elite™ meter. Different connectors 10, 12 were required for the two meters. After appropriate signal level translation and inversion of the Dex™ meter's output (at connector 10), the signals from the two connections were wire-ANDed 14. The composite signal was then used to drive a signal level translator 16 feeding the host computer's input 20. The Basic Cradle™ circuit schematic is shown in FIGS. 1 and 2.

The interface 30 of the invention (see FIGS. 3-5) buffers the meter output and performs the necessary signal level translation to drive exclusive OR logic that the invention uses to feed a level translator used to drive a host computer's EIA-232D interface. The buffer input also has a pull-up to support an open-collector (OC) output meter style interface. Because the OC meter interface contains series resistance of up to 10 KΩ, the buffer input voltage swing is never fully to ground and is influenced by the strength of the pull-up. The pull-up should be strong enough to overcome anticipated leakage currents, but should be weak enough to allow adequate signal swing. In the block diagrams (FIGS. 3 and 4), a comparator 32 referenced to a voltage negatively offset from the pull-up voltage is used as a voltage level translator to detect OC signal transitions and perform a voltage level translation. In practice, the comparator and reference functions might be implemented with a PNP transistor 70 (see FIG. 5).

The existing RS-232 (EIA-232) meter output is driven high in the spacing state. Under low battery conditions, the magnitude of the spacing output may be only 3V to 4V. The transition level for the buffer should be less than the minimum spacing voltage in order to detect the transition. As illustrated in the block diagrams (FIGS. 3 and 4), this might be accomplished by regulating the pull-up voltage just below the 3V to 4V range of the minimum spacing voltage. An alternative, not diagrammed, is to use the output of the comparator 48 to modify the input threshold when an RS-232 (ETA-232) type or "Dex™" meter is detected. The interface buffer should withstand RS-232 (EIA-232) signal levels (±15 V maximum) without damage. The computer interface software should be tolerant of any break characters or chatter that may occur when connecting or disconnecting a "Dex™" meter.

Like the "Basic Cradle™," power for the interface of the invention is derived from the host computer's DTR and TxD signals. Maximum loading of these pins should be consistent with the drive capabilities of an EIA-232 interface. Ideally, current required to operate the interface should be less than 1 mA.

Although not shown, ESD (electrostatic discharge) protection is recommended for all exposed interface signals.

Figure 6:
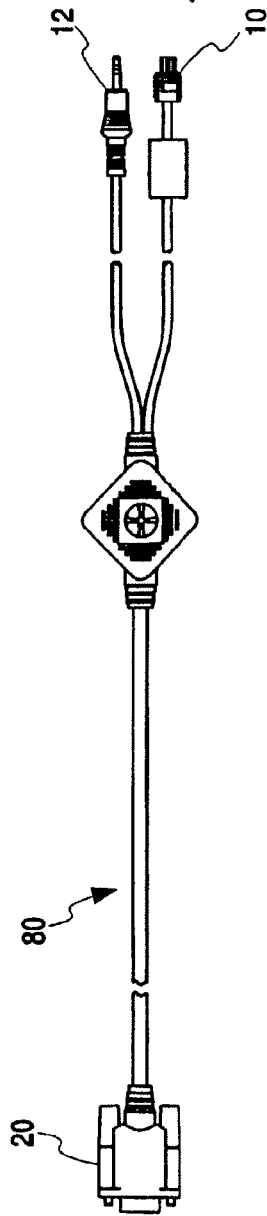
FIG. 6 is an illustration of an interface cable.

If an Elite™ meter compatible stereo plug 12 (not shown in FIG. 4) is connected in parallel to the Dex™ plug 10 (see also FIG. 6), the interface cable 80 can also be used for Bayer Corporation Elite™ and Catalyst™ meters.

For the proposed cable interface 80 (see FIG. 6), a single Dex™ compatible connector 10 must be shared for both (OC and RS-232 (EIA-232)) signaling conventions. As in the Basic Cradle™ design, the host computer's TxD output 40 (FIGS. 3-5) can directly drive the shared RxD/DATA_IN meter input 42. The shared TxD/DATA_OUT meter output connection requires unique handling for each interface type.

A distinguishing signal characteristic that the proposed interface can use to identify the type of meter interface connected is the marking voltage level. In the marking state, the Dex™ style interface voltage goes negative, typically by 5V to 15V. The open-collector interface is never driven to a negative voltage. If the meter's signal output is appropriately rectified and used to charge a small capacitor 44, the capacitor voltage should go negative when the Dex™ meter (RS-232 (EIA-232) output) is connected. A large value bleed resistor 46 (see FIG. 3) shunting the capacitor 44 will discharge the capacitor 44 if the Dex™ meter is disconnected. The capacitor should be sized so as to not excessively load and distort the meter output. The RC time constant should be optimized so that the capacitor voltage stays below a negative threshold during the normal spacing bits of Dex™ data transmissions. The maximum discharge time should be limited so that the interface can recognize the switch from a Dex™ to Elite™ style meter within a reasonable time period (several seconds). The capacitor 44 is monitored by a comparator 48 referenced to an appropriate threshold voltage (negative relative to that of the input driven by capacitor 44 when the meter's output is maintained at a voltage greater than or equal to signal ground, as would be characteristic of the OC meter output). The comparator 48 output will reflect the interface type. It can be used to control exclusive-OR logic 50 to appropriately invert the polarity of the meter output.

In operation, the rectified meter output signal is used to negatively charge the capacitor 44 whenever an RS-232 (EIA-232) compatible signal is present. The resistor 46 paralleling the capacitor is used to discharge it whenever the RS-232 (EIA-232) compatible signal is removed. The comparator 48 is used to compare the capacitor voltage with a negative threshold voltage. The RC time constant is optimized to minimize distortion of the data signal, to maintain the capacitor voltage more negative than the threshold voltage during spacing bits of an RS-232 (EIA-232) data stream, and to allow the capacitor to discharge above the threshold voltage if an RS-232 (EIA-232) marking voltage is not present for more than a few seconds.

Figure 5:
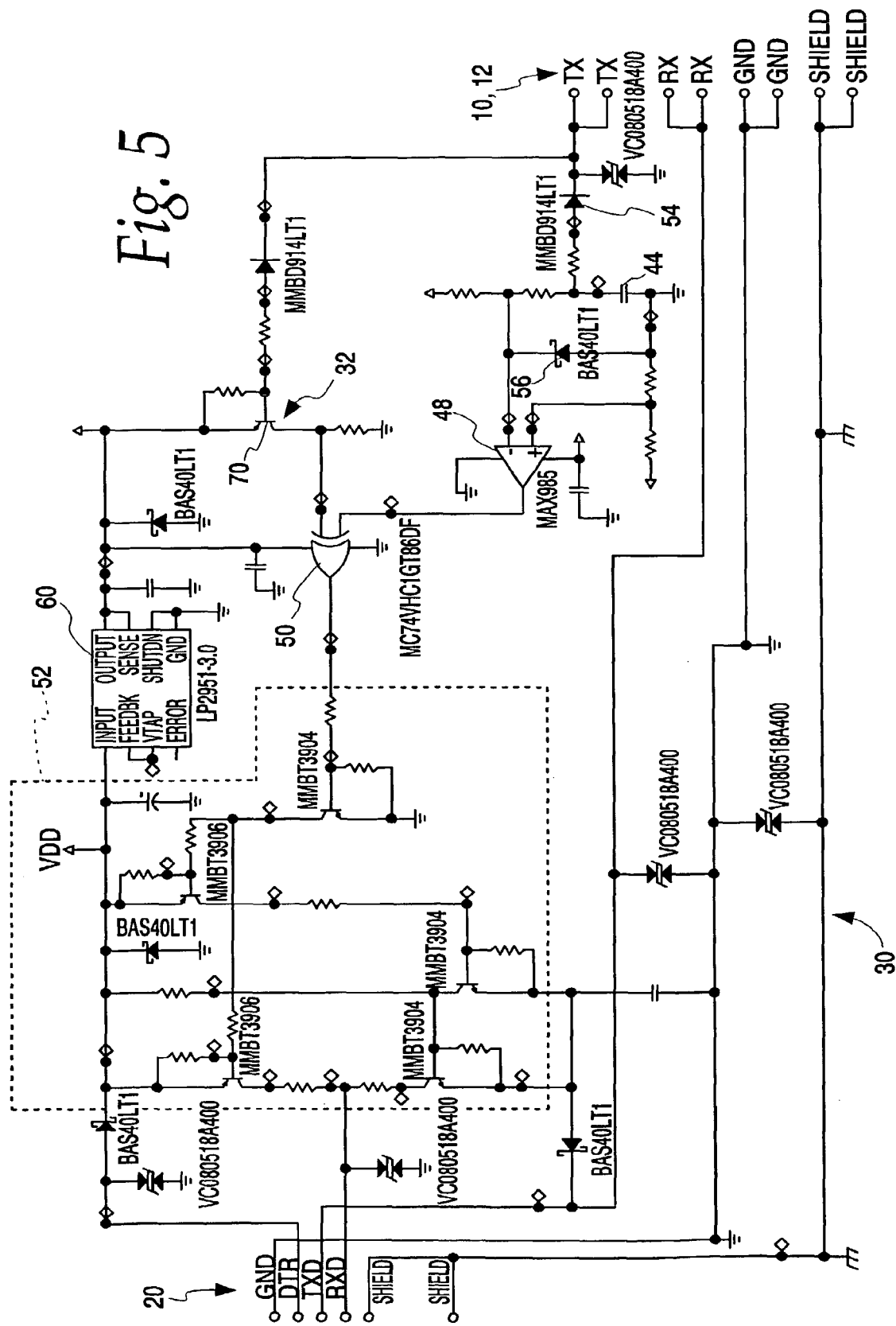
FIG. 5 is a detailed schematic of the interface of FIGS. 3 and 4.

The meter output is also fed to a voltage level translator 32 (70) to produce a common voltage swing for either type of meter output. A pull-up is used at the input to this level translator to handle the open-collector output of the Elite™ style interface. In FIG. 5, a voltage regulator 60 assures that the transition level for the level translator is within the signal swing for both the open-collector with pull-up and the RS-232 (EIA-232) signal swings. Alternatively, the output of the interface type detection comparator 48 can be used to adaptively adjust the transition level to match the presently connected interface type. The series resistance of the Elite™ style interface requires a transition voltage that is set close to, but below, the pull-up voltage of the interface. In a non-adaptive interface, this voltage must be less than the maximum 3V to 4V positive swing of a Dex™ meter under low battery conditions or RS-232 (EIA-232) transitions will not be recognized. In an adaptive system, the threshold voltage for an RS-232 (EIA-232) signal can be lowered closer to signal ground. The outputs of the level translator 32 and of the interface type detection comparator 48 are fed to the exclusive-OR logic 50. This logic corrects for the signal polarity inversion inherent in the two interface types. The polarity-corrected signal then drives a level translator 52 that produces an RS-232 (EIA-232) compatible signal for the host computer.

Figure 3:
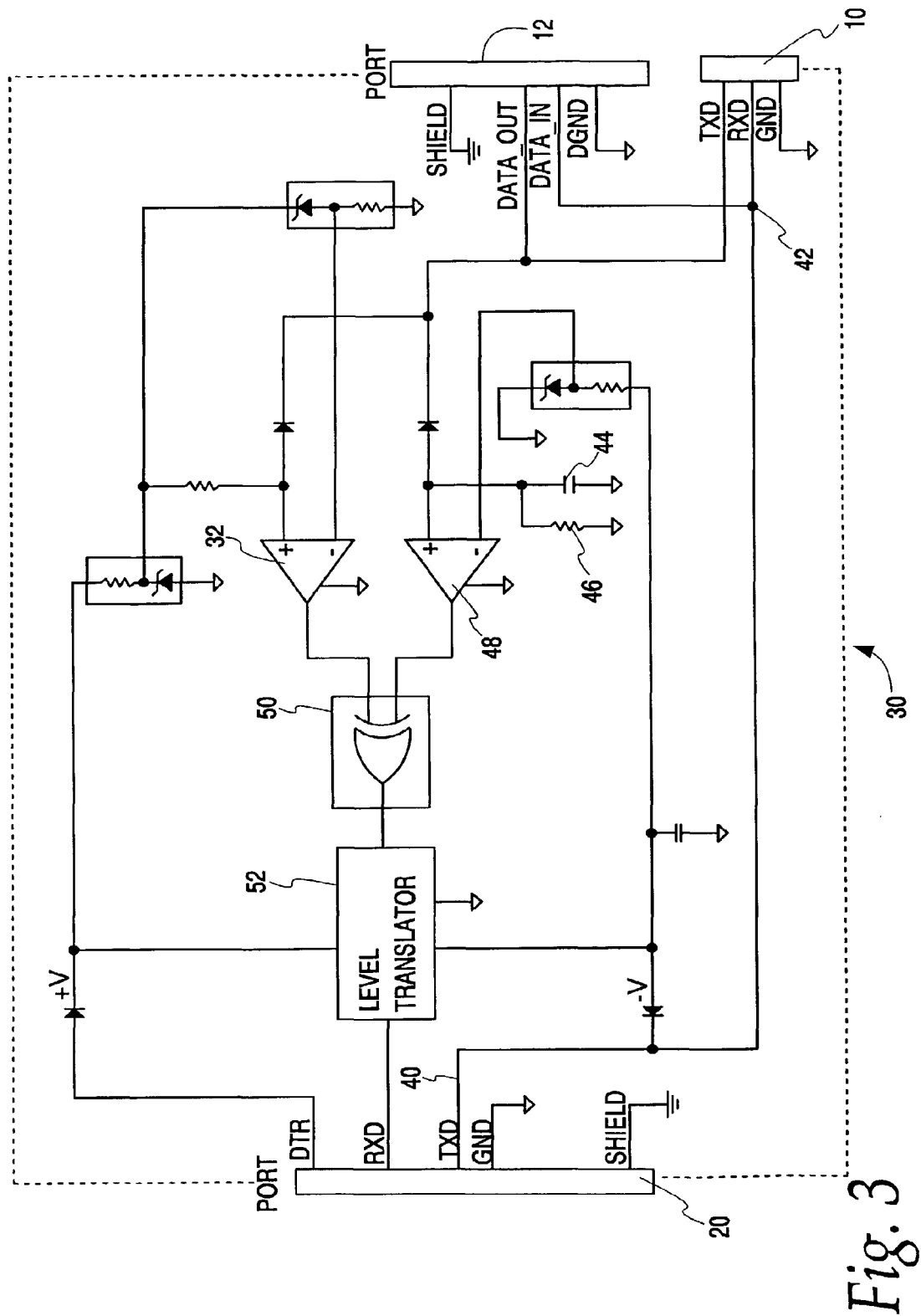
FIG. 3 is a simplified schematic of an interface in accordance with the invention.
Figure 4:
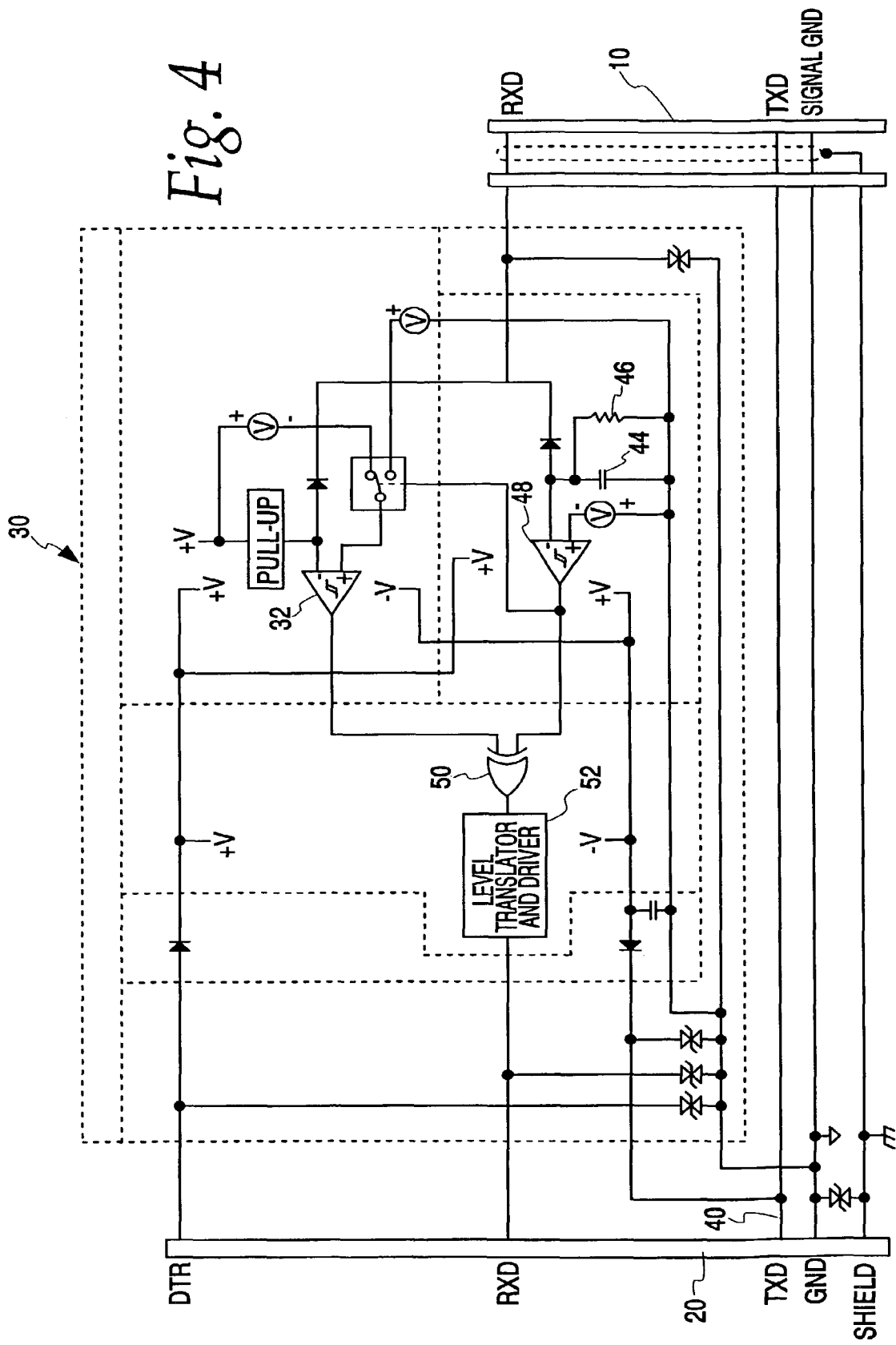
FIG. 4 is a second schematic, similar to FIG. 3, showing a meter interface of the invention.

Regarding the circuitry feeding comparator 48 in FIG. 5, in FIGS. 3 and 4, it was assumed that the comparator inputs could swing both positive and negative relative to ground. This would have required a comparator needing both positive and negative supplies. The implementation of FIG. 5 uses a low voltage comparator that can operate off of only the 3V regulator used to power the level translator. For a single supply comparator to work, both inputs must be biased positive relative to ground. Rather than a negative reference voltage, the reference input ("+") of comparator 48 is supplied a voltage slightly above ground by a resistive divider. This divider is supplied by the 3V regulator 60. A second resistive divider is also supplied by the 3V regulator and creates a positive bias from the capacitor 44 voltage for the other comparator 48 input (−). This divider also provides the equivalent function of the bleed resistor 46 of FIGS. 3 and 4. Instead of bleeding capacitor 44 to ground, the bleed is to +3V. When the negative Dex marking voltage is present, capacitor 44 is driven negative through a MMBD914LT1 diode 54. As the lower leg of the divider goes negative, the comparator 48 input driven by its center tap goes more negative than the reference input and the comparator state changes. A BAS40LT1 diode 56 clamps the comparator input near ground when the capacitor voltage goes negative so that the comparator is not damaged by negative voltage swings (marking voltage can go as low as −15V, which the comparator would not survive without the diode). This diode will not bleed the capacitor of positive voltages. Other than the positive biasing tricks to allow a single supply comparator to be used, the functionality is completely consistent with the other FIGS. 3 and 4.

The invention recognizes that the negative marking voltage produced by the RS-232 (EIA-232) compatible interface of the existing Dex™ meter is a distinguishing signal characteristic that can be used reliably to distinguish between interface types. It also recognizes that a rectifier and capacitor combination provide a simple method for detection that rejects the spacing bits of an RS-232 (EIA-232) data stream and that this "filtered" signal can be used to control polarity correction and threshold setting for the input buffer.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An interface system for delivering an output signal in response to receiving a first input signal, said interface system comprising:
   an interface that connects to a medical device;
   a signal input for receiving a first input signal from the medical device via said interface, said first input signal having a marking voltage characteristic;
   a detector circuit configured to receive said first input signal, said detector circuit including a rectifier-capacitor circuit or a resistor-capacitor circuit, said detector circuit determining, with said rectifier-capacitor circuit or said resistor-capacitor circuit, said marking voltage characteristic of said first input signal, said detector circuit identifying said first input signal and differentiating said first input signal from a second input signal according to said marking voltage characteristic; and
   a translator circuit that translates the first signal input into an output signal in response to said detector circuit identifying said first input signal.

2. The system of claim 1 wherein said output signal is compatible with an input of a digital signal processor.

3. The system of claim 1 wherein said translator circuit includes a polarity setting circuit and a level setting circuit.

4. The system of claim 1 further comprising a voltage level translator that produces a common voltage swing for said first signal input.

5. The system of claim 1 wherein said first input signal is an RS-232 (EIA-232) output signal and said second input signal is an open-collector output signal, or wherein said first input signal is an open-collector output signal and said second input signal is an RS-232 (EIA-232) output signal.

6. An interface method for delivering an output signal in response to receiving a first input signal, said method comprising:
   connecting a medical device to an interface;
   receiving a first input signal from the medical device via said interface, said first input signal having a marking voltage characteristic;
   determining, with a detector circuit, said marking voltage characteristic of said first input signal, said detector circuit including a rectifier-capacitor circuit or a resistor-capacitor circuit, said detector circuit identifying said first input signal and differentiating said first input signal from a second input signal according to said marking voltage characteristic; and
   translating the first signal input into an output signal in response to said detector circuit identifying said first input signal.

7. The method of claim 6 wherein said output signal comprises a signal compatible with an input of a digital signal processor.

8. The method of claim 6 wherein said translating includes setting a polarity and setting a level.

9. The method of claim 6 further comprising translating a voltage level of said first input signal.

10. The method of claim 6 wherein said first input signal is an RS-232 (EIA-232) output signal and said second input signal is an open-collector output signal, or wherein said first input signal is an open-collector output signal and said second input signal is an RS-232 (EIA-232) output signal.

11. An interface system for delivering an output signal in response to receiving a first input signal, said interface system comprising:
   an interface that connects to a medical device;
   a signal input for receiving a first input signal having a signal characteristic, said first input signal being received via said interface, said first input signal having a marking voltage characteristic;
   a detector circuit configured to receive said first input signal, said detector circuit including a capacitor and a comparator, said detector circuit determining, with said capacitor and said comparator, said marking voltage characteristic of said first input signal, wherein said capacitor receives a charge corresponding to said marking voltage characteristic and said comparator that determines said charge, said detector circuit identifying said first input signal and differentiating said first input signal from a second input signal according to said marking voltage characteristic; and
   a translator circuit that translates the first signal input into an output signal in response to said detector circuit identifying said first input signal.

12. The system of claim 11 wherein said output signal comprises a signal compatible with an input of a digital signal processor.

13. The system of claim 11 wherein said translator circuit includes a polarity setting circuit and a level setting circuit.

14. The system of claim 11 further comprising a voltage level translator that produces a common voltage swing for said first signal input.

15. The system of claim 11 wherein said first input signal is an RS-232 (EIA-232) output signal and said second input signal is an open-collector output signal, or wherein said first input signal is an open-collector output signal and said second input signal is an RS-232 (EIA-232) output signal.

16. An interface method for delivering an output signal in response to receiving a first input signal, said method comprising:
   connecting a medical device to an interface;
   receiving a first input signal via said interface, said first input signal having a marking voltage characteristic;
   determining, with a detector circuit, said marking voltage characteristic of said first input signal, said detector circuit including a capacitor and a comparator, said detector circuit identifying said first input signal, wherein said capacitor receives a charge corresponding to said marking voltage characteristic and said comparator that determines said charge, said detector circuit identifying said first input signal and differentiating said first input signal from a second input signal according to said marking voltage characteristic; and
   translating the first signal input into an output signal in response to said detector circuit identifying said first input signal.

17. The method of claim 16 wherein said output signal comprises a signal compatible with an input of a digital signal processor.

18. The method of claim 16 wherein said translating includes setting a polarity and setting a level.

19. The method of claim 16 further comprising translating a voltage level of said first input signal.

20. The method of claim 16 wherein said first input signal is an RS-232 (EIA-232) output signal and said second input signal is an open-collector output signal, or wherein said first input signal is an open-collector output signal and said second input signal is an RS-232 (EIA-232) output signal.

* * * * *